US011884508B2

(12) United States Patent
Kuusinen et al.

(10) Patent No.: US 11,884,508 B2
(45) Date of Patent: Jan. 30, 2024

(54) METHOD FOR ALLOCATING ELEVATOR CALLS AND ELEVATOR SYSTEM

(71) Applicant: KONE Corporation, Helsinki (FI)

(72) Inventors: Juha-Matti Kuusinen, Helsinki (FI); Marja-Liisa Siikonen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1389 days.

(21) Appl. No.: 16/274,005

(22) Filed: Feb. 12, 2019

(65) Prior Publication Data

US 2019/0177118 A1 Jun. 13, 2019

Related U.S. Application Data

(63) Continuation of application No. PCT/EP2016/073122, filed on Sep. 28, 2016.

(51) Int. Cl.

*B66B 1/46* (2006.01)
*B66B 1/24* (2006.01)

(52) U.S. Cl.

CPC ............ *B66B 1/468* (2013.01); *B66B 1/2408* (2013.01); *B66B 2201/103* (2013.01); (Continued)

(58) Field of Classification Search

CPC . B66B 1/468; B66B 1/2408; B66B 2201/103; B66B 2201/215; B66B 2201/4669; B66B 2201/4684

See application file for complete search history.

(56) References Cited

U.S. PATENT DOCUMENTS 4,662,479 A 5/1987 Tsuji et al.
10,106,371 B2 * 10/2018 Hanninen ............... B66B 1/468
(Continued)

FOREIGN PATENT DOCUMENTS

CN 102596775 A 7/2012
EP 3228570 A1 * 10/2017 ........... B66B 1/2408
(Continued)

OTHER PUBLICATIONS

International Search Report (PCT/ISA/210) issued in PCT/EP2016/073122, dated Jul. 7, 2017.
(Continued)

*Primary Examiner* — Jeffrey Donels

(74) *Attorney, Agent, or Firm* — Birch, Stewart, Kolasch & Birch, LLP

(57) ABSTRACT

The invention relates to a method for allocating elevator calls in an elevator system (10) comprising at least one elevator (12*a*-12*c*), which elevator system (10) is controlled by an elevator control (16) comprising a destination call allocation control, wherein passenger IDs are inputted into at least one I/O-device (20) of the elevator system (10), whereafter based on the passenger ID a destination call is issued comprising the floor of the I/O-device (20) as departure floor and a preset or inputted destination floor as destination floor of the elevator call. According to the invention when a new destination call is issued, it is checked whether or not a destination call is still pending under the same passenger ID, and if a destination call of said person is still pending, either the new call or the pending call is cancelled.

19 Claims, 2 Drawing Sheets

(52) U.S. Cl.
CPC . *B66B 2201/215* (2013.01); *B66B 2201/4669* (2013.01); *B66B 2201/4684* (2013.01)

(56) References Cited

U.S. PATENT DOCUMENTS

| | | | | |
|---|---|---|---|---|
| 2012/0152660 | A1 | 6/2012 | Fujihata et al. | |
| 2013/0264150 | A1* | 10/2013 | Koba | B66B 1/2458 187/382 |
| 2016/0244295 | A1* | 8/2016 | Salmikuukka | B66B 1/2458 |
| 2017/0291795 | A1* | 10/2017 | Scoville | B66B 1/2408 |
| 2018/0118509 | A1* | 5/2018 | Simcik | B66B 1/468 |
| 2018/0118510 | A1* | 5/2018 | Simcik | G06F 3/0484 |

FOREIGN PATENT DOCUMENTS

| | | | | |
|---|---|---|---|---|
| JP | H04 338079 | A | 11/1992 | |
| WO | WO 2015/070926 | A1 | 5/2015 | |
| WO | WO-2016165782 | A1 * | 10/2016 | B66B 1/468 |
| WO | WO-2017175021 | A1 * | 10/2017 | B66B 1/2408 |

OTHER PUBLICATIONS

Written Opinion of the International Searching Authority (PCT/ISA/237) issued in PCT/EP2016/073122, dated Jul. 7, 2017.

* cited by examiner

METHOD FOR ALLOCATING ELEVATOR CALLS AND ELEVATOR SYSTEM

CROSS REFERENCE TO RELATED APPLICATION

This application is a Continuation of PCT International Application No. PCT/EP2016/073122, filed on Sep. 28, 2016; which is hereby expressly incorporated by reference into the present application.

The present invention relates to elevator systems. Especially, the invention aims at improving the performance of an elevator group based on destination control system where each destination call has a passenger ID associated to it. In such a system, every passenger has to unlock an I/O-device, e.g. a destination operation panel (DOP) by showing an access- or ID card or similar access device in order to give a call to a desired destination floor, which could either be pre-set or manually chosen. The departure floor of the destination call is usually the floor of the location of the I/O-device where the call has been entered. In addition, every call is immediately allocated to an elevator and the allocated elevator is immediately signalled to the passenger. Every destination call causes a stop of the elevator car at the departure floor and at the destination floor of the call. For each call, also the space of at least one passenger is reserved from the allocated elevator. Hence, every false destination call causes unnecessary stops, which increases round trip times and decreases the handling capacity of the elevator group. Also, unnecessary space is reserved from the allocated elevator which may cause unnecessary bypassing of other calls. This decreases the performance of the elevator group.

It is therefore an object of the present invention to provide a method for allocating elevator destination calls which leads to an improvement of the performance of the elevator system. The object is solved with a method as well as with an elevator system. Preferred embodiments of the invention are also described in the specification as well as in the drawings.

In the inventive method for allocating elevator calls in an elevator system, at least one elevator, preferably several elevators, are controlled by an elevator control comprising a destination call allocation control for allocating an elevator to a given call. In the destination call allocation control, passenger IDs are inputted into at least one I/O-device of the elevator system, whereafter based on the passenger ID, a destination call is issued comprising the floor of the I/O-device where the passenger ID has been inputted as departure floor as well as a preset or inputted destination floor as destination floor of the destination call.

The I/O-device is preferably an operating panel, particularly a DOP which is located particularly in the lobby at each floor of the elevator system. The I/O-device could also be a card reader or an RFID transmitter which may be located for example in the vicinity of an operating panel, particularly a DOP, or of an elevator.

According to the invention, when a (new) destination call is issued via the inputting of the passenger ID, it is checked whether or not a pending (old) destination call is still present under the same passenger ID. Pending call in this context means that this call has not yet been served. If a destination call of said passenger ID is still pending, the pending call or the new call will be cancelled and the new call is entered to call allocation or the pending call is kept in call allocation. Via this measure, the reservation of several elevator calls for one and the same person is prevented. This leads to a better capacity and performance of the elevator system as no room or elevator is reserved for an elevator ride which is not going to be performed. Furthermore, unnecessary stopping or unnecessary travels of elevator cars are prevented. Further no unnecessary space is reserved in the cars which will increase the overall capacity of the elevator system. Accordingly, with the inventive method, the performance of the elevator system, particularly an elevator group with several elevators is improved essentially.

Thus, By re-signalling, or cancelling and reallocating destination calls based on the passenger IDs, a performance decrease as known from current systems can be avoided.

Following advantageous options are possible to prevent multiple call of one passenger ID. With the issuing of a new call the passenger is prompted to confirm the new call, and only if this confirmation is given, the new call is entered to call allocation, whereas if the confirmation is not given the new claim is cancelled whereas the pending call is kept in call allocation. This ensures, that the new call is given on purpose and not accidentally, e.g. by accidentally pressing a button of his mobile device, which may act as an input device of the elevator system.

In another advantageous alternative the new call and the pending call are displayed on the I/O-device, preferably the DOP or a mobile device, e.g. smartphone of the passenger and the passenger is prompted to select between the two calls whereafter the selected call is entered to call allocation whereas the not selected call is cancelled. Also this ensures a conscious selection of the travel which is intended by the passenger with the elevator system.

As an example, a situation is considered where a passenger first gives a call to a given destination, e.g., home floor call from a turnstile, and then after a while another or several false calls to the same destination. If all of the calls are allocated to the same elevator, then unnecessary space is reserved from the elevator and the group control may not allocate the elevator to other calls or passengers. On the other hand, if the first and at least some of the false calls are allocated to different elevators, then at least one of the allocated elevators may make unnecessary stops and reserve space that will not be used. Instead of actually allocating each of the false calls, the elevator group control detects that the calls are all associated to the same passenger ID and only re-signal to the passenger the elevator already allocated to the first call. In this way, the elevator group control can avoid reserving extra space for the same passenger that would result in a performance decrease because of unnecessary stops or space reservation.

As another example, a situation is considered where a passenger first gives a call to a given destination but then wants to change the destination and gives a new call to the new destination. If the new call is actually allocated to the same or a new elevator, then one of them may make unnecessary stops and reserve space that will not be used.

Instead of actually allocating both of the calls, the elevator group control should detect that several calls are associated to the same passenger ID and cancels the old or new call and the corresponding allocation. Preferably the decision which call is going to be kept and which is going to be cancelled can be made either in a preset mode (always the new call or always the old call is cancelled) or by means of passenger interaction, wherein the passenger is prompted to confirm the new call or where he is prompted to select between the calls. This will also result in better performance.

Also following decision criterions may preferably be applied for keeping the old (pending) call (allocation) or allocate the new call:

- If the old call has been registered using one of predefined I/O-devices, then the new call is always allocated, even if the destination of the new call is the same as the destination of the old (pending) call. Typically such predefined I/O-devices would be located remote from the elevators, e.g. in a parking hall or at an entrance door.
- If a predefined time has lapsed since the old call was registered, but the call is still not served, the new call is always allocated, meaning that the old call is cancelled.

Both of the above criteria is adapted to improve the capacity of the elevator system because the situation in the elevator system may be difficult to handle when the elapsed time since the last call registration of the passenger is long, which is the case in remote located I/O-devices.

The problem that the present invention also solves is the possible destination group control performance deterioration in situations where same passengers give several destination calls to the same or different destination floors from the same origin floor. The passengers can easily be recognized from the access control ID.

The inventive elevator system comprises a group control based on destination and access control uses passenger or destination call IDs to detect calls given by the same passengers. If a passenger gives a new or several new calls from the same origin floor to the same destination floor before the first call has been served, the elevator group control detects that the calls are given by the same passenger and re-signals to the passenger the elevator that was allocated to the first call. If a passenger gives a new call preferably from the same origin floor (location of the input device) to a different destination floor than the current destination floor of the passenger before the current call has been served, the elevator group control detects that the call to the new destination was given by the same passenger and performs one of the above mentioned options. To detect passengers based on their IDs and to re-signal, or cancel and reallocate destination calls, the elevator group control consists of:

- Destination operation panels with integrated access control and signalization displays
- A collision circuit in the destination call allocation control preventing allocating a destination call if a call with the same passenger ID and destination already exists
- The collision circuit either cancels a pending destination call and allocation decision if a new call with the same passenger ID is given to a different destination from the same origin floor before the previous call is served or cancels the new call according to the above mentioned options.

The invention improves the performance of the elevator group control in situations where one or more passengers give several destination calls preferably from the same origin floor to the same or different destination floors.

The I/O device may also be located far from the elevators, for example in a parking hall or close to an entrance door. In such cases it may take a long time to reach elevators from the I/O device.

One of the reasons why passengers want to give a new call is that they are not sure whether they have already issued a call or they have forgotten that they have already issued a call or they have forgotten elevator allocated for the already issued call. Therefore the issue a new call (possibly with the same destination) and thus the current allocation is re-signalled or the new call is allocated and the allocated elevator is signalled. Thus, the invention solves also this "forgetting"—problem.

In a preferred embodiment of the invention, the new call is cancelled only if the departure floor of the pending call and the new call is identical. With this measure it is ensured that calls are cancelled which are either given accidentally or in cases where the passenger has entered the departure floor for example via preset setting and then has reconsidered his destination. In both cases, the I/O-device, where the passenger ID is inputted to the elevator system, is the same.

In a preferred embodiment of the invention, the passenger is informed about his new destination after the pending call has been cancelled and the new call is entered to the call allocation. Furthermore, the passenger is preferably also informed about the ID (number) of the elevator to serve the call and preferably about the direction in which he has to move to get to his allocated elevator. This confirms to the passenger that now the call has been entered which leads to the destination according to his last input.

In a preferred embodiment of the invention, the passenger is informed that his pending call has been cancelled. Via this measure, the passenger is informed that he has already given a call to the elevator system which might inform him that he has accidentally done so. On the other hand, if he did it on purpose, he is informed that his old destination is removed confirming further the entering of his new call.

In this case, preferably the passenger is also informed about the destination of the cancelled pending call. Also this provides further information for the passenger to be aware what destination has been cancelled from the elevator system.

Preferably, the passenger is requested to confirm his new call before it is allocated and the pending call is cancelled. Via this step, the passenger is actively involved into the re-issuing of the call so that he has to consider the old destination as well as the new destination by confirming this change for example by pushing a button on the destination operating panel. If, for example, the passenger has accidentally given the old destination call, he is now informed that such a call is given. On the other hand, maybe he has given the new call accidentally so that he can reject the change of the destination so that still his pending (old) call is handled within the destination call allocation control. This offers better security against accidental automatic elevator calls which are possibly going to happen with automatic call giving systems based on passenger ID cards or RFID tags. In this connection it has to be mentioned that preferably a destination call is inputted by the passenger via an ID card or an RFID tag into the elevator system. Via this measure, no manual interaction with the destination operating panel has to be performed to enter the call with the elevator system.

In a preferred embodiment of the invention, the new call is immediately allocated after being inputted into the I/O-device of the elevator which may be a DOP of the elevator system or a mobile device (smartphone). Usually, a destination call control is correlated with immediate allocation which is advantageous as when the call is issued the passenger is standing in front of the destination operating panel and therefore, the elevator system is able to immediately show him the allocated elevator as well as preferably also the direction to reach said elevator as long as the passenger is standing in front of the destination operating panel.

Preferably, the allocated elevator is indicated to the passenger via a display of the operating panel (DOP) and preferably also the direction to the allocated elevator is indicated for example via an arrow. This facilitates the use of the elevator system essentially.

The invention also relates to an elevator system comprising at least one elevator, particularly several elevators, an elevator control controlling the elevator, at least one I/O-device, preferably a DOP, which elevator control comprises a destination call allocation control, which destination call allocation control is configured to allocate a destination call based on a passenger ID inputted into the I/O-device, for example via the DOP or mobile device, and which destination call allocation control comprises a collision circuit which is configured to check with the input of a new destination call whether any destination call with the same passenger ID is still handled by the destination call allocation control and which is configured to cancel the pending destination or new call if the result of the check is positive. With respect to the features and advantages of the inventive elevator system it is referred to the statements with respect to the inventive method.

Preferably, the I/O-device is a destination call operating panel (DOP). Destination call operating panels are widely used in elevator systems with destination call allocation and are an advantageous measure to indicate allocated elevators to the passengers and lead them to the allocated elevators. Advantageous is also the use of mobile devices as smartphones which may act via appropriate Apps as I/O-devices of the elevator system.

In a preferred embodiment of the elevator system, the collision circuit is configured to initiate the display of the destination of the new call on the destination operating panel. So the passenger is immediately informed about his new allocated car as well as the changed destination. In this connection it could also be indicated to the passenger in a preferred embodiment that an old pending destination call has been cancelled.

Preferably, the elevator system comprises a card reader and/or an RFID-transmitter to communicate wirelessly with ID-containing tags or cards carried by the passengers.

It is clear for the skilled person that the above-mentioned different embodiments of the invention can be combined arbitrarily. Particularly, the inventive elevator system is intended to use the method described above and the described method is preferably intended to be performed in connection with the described elevator system.

The following terms are used as synonyms in this application: I/O-device—destination call operating panel—DOP; pending destination call—pending call—old destination call—old call; new destination call—new call; call—destination call; elevator system—elevator group; elevator control—group control;

It is obvious that the invention is particularly designed for elevator groups comprising several elevators or even multi-groups comprising different elevator groups allocated to different zones of a building.

The invention is hereinafter described in an embodiment with the aid of the schematic drawings: In these drawings.

Figure 1:
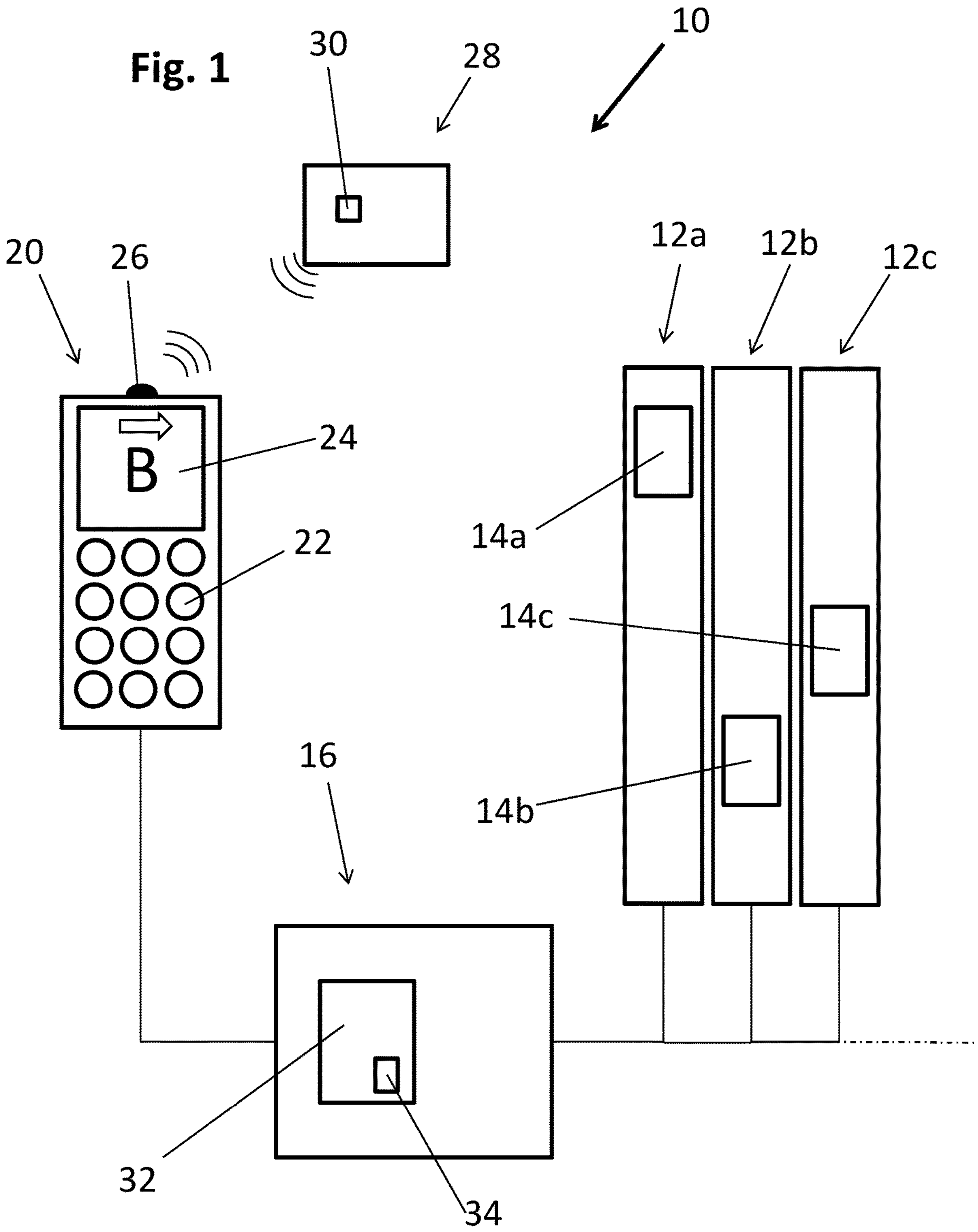
FIG. 1 shows a diagram of an inventive elevator system.

In FIG. 1, an elevator system 10 is shown having several elevators 12*a*-12*c* in which elevator cars 14*a*-14*c* are driving vertically along a shaft. The elevators 12*a*-12*c* are controlled by an elevator control 16. The elevator system 10 has DOPs 20 are preferably located at each elevator lobby of each different floor of the building in which the elevator system is mounted. Each destination operating panel comprises push buttons 22 for inputting data, a display 24 to indicate allocated elevators as well as for example an arrow for indicating the direction of an allocated elevator as well as a transmitter 26 to communicate with ID cards 28 carried by the passengers of the elevator system 10. Each ID card 28 has an ID tag 30, for example an RFID tag which communicates with the transmitter 26 of the DOP 20. The elevator control 16 comprises a destination call allocation control 32 comprising a collision circuit 34. The elevator system may also communicate with mobile devices as smartphones which have with respect to the functionality of the elevator system 10 the same function as the DOP 20.

The inventive elevator system works as follows:

When a passenger enters the elevator lobby, his ID card 28 comprising an RFID tag gets into interaction with the transmitter 26 of DOP when getting near to the DOP. Via the interaction, a destination floor is automatically inputted into the destination call allocation control 32 of the elevator control 16 together with the departure floor which is the floor of the location of the DOP 20 where the call has been inputted. Alternatively, the user also may input a different destination than a possible preset destination via the push buttons 22 of the DOP 20. When entering a new destination call, the allocated elevator is immediately displayed on the display 24 preferably together with a direction in which the allocated elevator is situated. The collision circuit 34 of the destination call allocation control 32 checks with each inputted new destination call whether a destination call with the same passenger ID is still pending, i.e. not served. If this is the case, either the pending destination call is cancelled and the new destination call is entered into the call allocation performed by the destination call allocation control 32 or the new call is cancelled and the pending call is kept in call allocation. Preferably the passenger is informed of the fact that several calls are present with his ID and he has the possibility to select the valid one by interaction via the DOP 20 as I/O-device of the elevator system 10.

Figure 2:
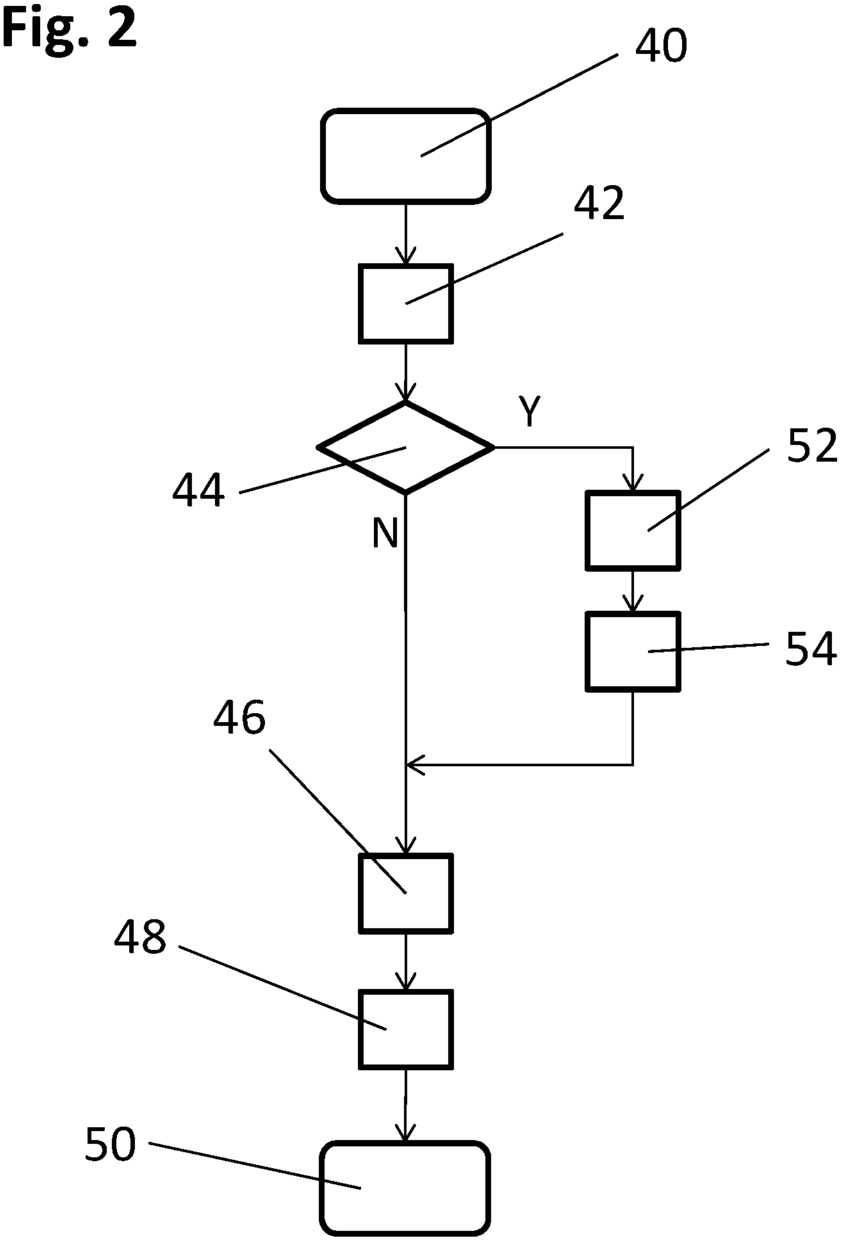
FIG. 2 shows a flow diagram of the inventive method performed in an elevator system, particularly in an elevator group with several elevators.

An advantageous routine for the cancellation of a pending (old) destination call of the same passenger ID is shown in the flow diagram of FIG. 2.

The start point 40 shows the start of a call allocation routine of the destination call allocation control 32 of the elevator system 10 of FIG. 1. At process point 42, a new destination call is inputted by an I/O-device 20 of the elevator system 10, particularly a DOP 20. With the call input, the elevator system receives the passenger ID, the departure floor from the location of the I/O-device as well as a destination floor which is either preset or manually inputted by the passenger into the I/O-device.

In the following decision step 44, the destination call allocation control 32, particularly the collision circuit 34 of it, looks whether a destination call of the same passenger ID is still pending in the destination call allocation control 32 of the elevator control 16. If this is not the case, an elevator is immediately allocated by the destination call allocation control 32 in process step 46. Further in process step 48 the allocated elevator and preferably the direction of it is/are displayed to the passenger via the DOP 20 whereafter the process ends in the termination point 50.

If in the decision step 44 it is found that an old destination call of the same passenger ID is pending, then, the old pending destination call is cancelled in the following process step 52. Further in the following process step 54 the passenger is informed via the DOP 20 that his old pending destination call has been cancelled. Thereafter, the process branches to process step 46 where the new destination call is entered to call allocation so that an elevator is allocated in step 46 and the allocated elevator is displayed to the passenger in step 48 whereafter the process proceeds to termination step 50.

The above-mentioned embodiments should not be understood as delimiting the invention. Rather, the invention can be carried out within the fines of the appended patent claims.

LIST OF REFERENCE NUMBERS

10 elevator system
12*a-c* elevators
14*a-c* elevator cars
16 elevator control—group control
20 destination operating panel—DOP—I/O-device
22 push buttons of the DOP
24 display of the DOP
26 wireless transmitter of the elevator system
28 ID-card
30 ID-tag—RFID-tag
32 destination call allocation control
34 collision module
40 start point
42 input new destination call with passenger ID
44 decision step—call with same passenger ID already pending?
46 immediate call allocation of new destination call
48 display of allocated elevator
50 termination point
52 pending destination call cancelled
54 information to passenger that a pending call has been cancelled

The invention claimed is:

1. A method for allocating elevator calls in an elevator system comprising at least one elevator, the elevator system being controlled by an elevator control comprising a destination call allocation control, said method comprising the steps of:

inputting passenger IDs into a I/O-device of the elevator system;

whereafter, based on the passenger ID, issuing a destination call comprising the floor of the I/O-device as a departure floor and a preset or inputted destination floor as a destination floor of the elevator call;

when a new destination call is issued, checking whether or not a destination call is still pending under the same passenger ID; and if a destination call of a passenger under the same passenger ID is still pending, cancelling either the new call or the pending call, wherein an allocated elevator is indicated to the passenger via a display of the I/O-device.

2. The method according to claim 1, wherein the pending call is cancelled and the new call is entered to the destination call allocation control.

3. The method according to claim 2, wherein the passenger is informed that the pending call has been cancelled.

4. The method according to claim 1, wherein the passenger is prompted to confirm the new call, and only if a confirmation is given, the new call is entered to the destination call allocation control, whereas if the confirmation is not given the new call is cancelled whereas the pending call is kept in the destination call allocation control.

5. The method according to claim 1, wherein the new call and the pending call are displayed on the I/O-device and the passenger is prompted to select between the new call and the pending call whereafter the selected call is entered to the destination call allocation control whereas the not selected call is cancelled.

6. The method according to claim 1, wherein the passenger is informed about the new destination.

7. The method according to claim 1, wherein the passenger is informed about the destination of the cancelled pending call.

8. The method according to claim 1, wherein the destination call is inputted via an ID card of a RFID tag.

9. The method according to claim 1, wherein the call is immediately allocated after being inputted to the I/O-device.

10. The method according to claim 4, wherein the confirmation of which call is going to be kept and which call is going to be cancelled is made in a preset mode, wherein always the new call or the pending call is kept and the other of the new call and the pending call is cancelled.

11. The method according to claim 1, wherein if the pending call has been registered using one of predefined I/O-devices, then the new call is always allocated.

12. The method according to claim 1, wherein if a predefined time has lapsed since the pending call was registered but is still not served, the new call is always allocated and the pending call is cancelled.

13. An elevator system comprising at least one elevator, an elevator control controlling the elevator, a I/O-device, the elevator control comprising a destination call allocation control, the destination call allocation control being configured to allocate a destination call based on a passenger ID inputted into the I/O-device, wherein the destination call allocation control comprises a collision circuit configured to check with the input of a new destination call whether any destination call of a passenger with the same passenger ID is still pending, in which case the collision circuit is configured to cancel the pending destination call and enter the new destination call into the destination call allocation control or to cancel the new call and keep the pending destination call in the destination call allocation control, wherein an allocated elevator is indicated to the passenger via a display of the I/O-device.

14. The elevator system according to claim 13, wherein the I/O-device is a destination call operating panel (DOP).

15. The elevator system according to claim 13, wherein the collision circuit is configured to initiate the display of data of the cancelled call on the I/O-device.

16. The elevator system according to claim 13, wherein the collision circuit is configured to initiate the display the destination of the new call on the I/O-device.

17. The elevator system according to claim 13, wherein the elevator system comprises a card reader and/or an RFID-transmitter.

18. The method according to claim 2, wherein the passenger is prompted to confirm the new call, and only if a confirmation is given, the new call is entered to the destination call allocation control, whereas if the confirmation is not given the new claim is cancelled whereas the pending call is kept in the destination call allocation control.

19. The method according to claim 3, wherein the passenger is prompted to confirm the new call, and only if a confirmation is given, the new call is entered to the destination call allocation control, whereas if the confirmation is not given the new claim is cancelled whereas the pending call is kept in the call allocation control.

* * * * *